United States Patent [19]

Erikson et al.

[11] E Patent Number: Re. 31,713

[45] Reissued Date of Patent: Oct. 30, 1984

[54] ANTI-BACKLASH NUT ASSEMBLY

[76] Inventors: Keith W. Erikson, 7 Quarry Circle Dr., Milford, N.H. 03055; Kenneth W. Erikson, Peasley Rd., Merrimack, N.H. 03054

[21] Appl. No.: 502,250

[22] Filed: Jun. 8, 1983

Related U.S. Patent Documents

Reissue of:

[64] Patent No.: 4,353,264
Issued: Oct. 12, 1982
Appl. No.: 189,333
Filed: Sep. 22, 1980

[51] Int. Cl.[3] ..... F16H 57/12; F16B 39/36

[52] U.S. Cl. ..... 74/441; 74/424.8 A

[58] Field of Search ..... 74/441, 409, 459, 424.8 A

[56] References Cited

U.S. PATENT DOCUMENTS

| | | | |
|---|---|---|---|
| 2,690,682 | 10/1954 | Passman | 74/441 |
| 2,715,341 | 8/1955 | Hogan | 74/459 |
| 2,857,778 | 10/1958 | Rokos | 74/441 |
| 3,094,011 | 6/1963 | Bradley | 74/424.8 A |
| 4,131,031 | 12/1978 | Erikson | 74/441 |
| 4,249,426 | 2/1981 | Erikson | 74/441 |

*Primary Examiner*—Allan D. Herrmann
*Attorney, Agent, or Firm*—Hamilton, Brook, Smith & Reynolds

[57] ABSTRACT

An anti-backlash nut assembly is disclosed of the type which undergoes translational movement longitudinally along a screw in response to relative rotational movement between the nut and screw. The assembly includes a nut which is split into first and second portions, both of which have an internal thread complementary to the external thread of the screw. The two portions of the nut are retained in the radial direction by a coaxial cylinder. A spacer means is mounted on the retainer means intermediate opposing surfaces of the nut portions and biased against at least one of said surfaces such that any gap which may occur between the thread of the screw and the thread of the nut will be closed by movement of the spacer.

8 Claims, 10 Drawing Figures

ANTI-BACKLASH NUT ASSEMBLY

Matter enclosed in heavy brackets [ ] appears in the original patent but forms no part of this reissue specification; matter printed in italics indicates the additions made by reissue.

TECHNICAL FIELD

This invention is in the field of anti-backlash nut assemblies.

BACKGROUND ART

It is often desirable to drive an element in a machine along a screw which provides accurate positional repeatability and constant drag torque control. Typical applications for such a device are for use in data printers and x-y tables which are used as peripheral equipment in the computer industry.

An example of such a positioning device may be found in U.S. Pat. No. 4,131,031, a previous invention of the patentees which, while it has met with considerable commercial success, has some inherent disadvantages which the present invention overcomes. In the invention of the U.S. Pat. No. 4,131,031, two portions of an axially-split nut are retained in the radial direction by a spacer retaining means and a spring is used to apply longitudinal or axial biasing forces which push the internal threads of the split nut against the flanks of the threads of the driving screw. In order to maintain intimate contact and to avoid backlash, it is necessary to utilize stiff springs which result in high system torque. The higher the system torque, the more expensive the motor needed to drive the system. Also with high system torque, a high degree of friction is created between the threads of the backlash nut and the screw threads which creates more wear on the threads and eventually results in less stiffness in the system. As the stiffness becomes lower, the poorer the repeatability of the system. The apparatus of the present invention has been found to overcome the aforegoing deficiencies in the U.S. Pat. No. 4,131,031 while at the same time, retaining some of the desirable features such as ease in manufacture and low cost.

DISCLOSURE OF THE INVENTION

This invention discloses a new anti-backlash nut assembly designed to undergo translational movement along a threaded screw in response to relative rotational movement between the two. This anti-backlash nut assembly contains a nut having a first and second portion. Both the first portion and the second portion of the nut are joined together to form a complete nut which is then capable of translational movement along the screw. Retaining means for retaining the first and second portions around the screw are provided, and one such means comprises a hollow cylindrical spacer. Means are provided on the hollow cylindrical spacer for taking up any slack which may occur by wear of the engaged screw threads. In a preferred embodiment of the invention, the means for taking up the slack consists of an internally threaded spacer which is mounted on threads provided on the retaining means and which is torsionally biased by a torsion spring. The spacer is forced to rotate by the torsion spring whenever any gap attempts to develop between the two opposing portions of the nut.

It may thus be seen that the anti-backlash nut assembly of this invention has several outstanding advantages. One of the main advantages is that in the apparatus of the present invention, unlike that of the U.S. Pat. No. 4,131,031, we are not relying on the force of the spring for system torque. Instead, in the apparatus of the present invention, there can be negligible system torque. In other words, in the "031" patent, a spring is used to establish a pre-load force which holds the nut threads against the screw threads. In the present invention, no such pre-load force is required. At the same time, axial stiffness also does not depend on the stiffness of the spring but is instead dependent on the fact that intimate contact between the flanks of the screw threads is maintained as the spacer means rotates on the retaining means and maintains intimate contact between the threads of the opposing nut members.

BEST MODE OF CARRYING OUT THE INVENTION

Figure 1:
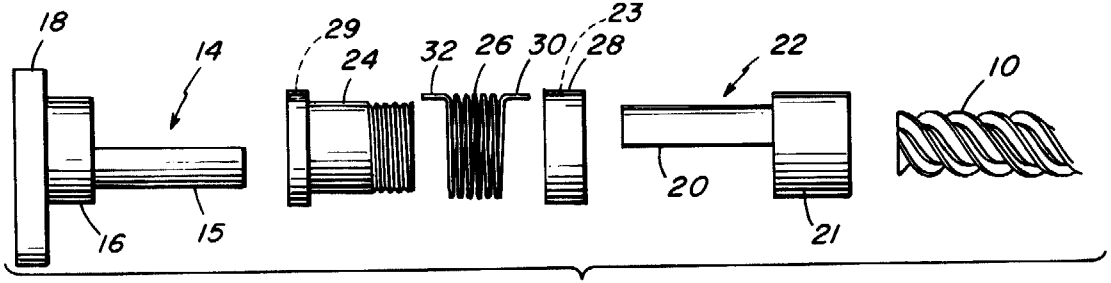
FIG. 1 is a side elevation of the disassembled components of an anti-backlash nut assembly of this invention.
Figure 2:
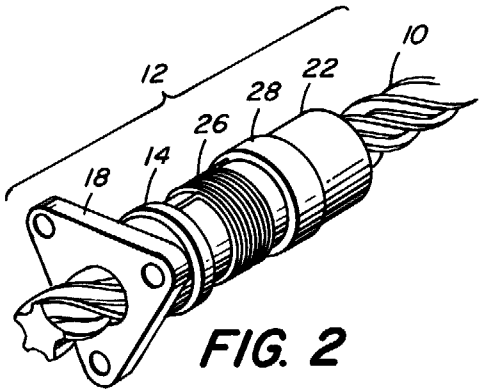
FIG. 2 is a perspective view illustrating an anti-backlash nut assembly according to this invention.
Figure 3:
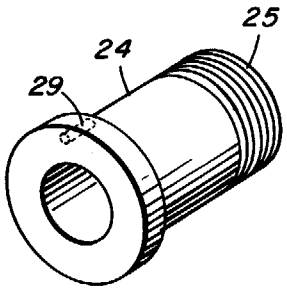
FIG. 3 is a perspective view of the retaining means of this invention.

This invention can be further described by referring to the Figures in more detail.

In FIGS. 1–4, one embodiment of an anti-backlash nut assembly is illustrated having a screw 10 and a nut assembly 12. The unique construction of nut assembly 12 can be seen clearly in FIGS. 1–4. There are two opposing nut portions 14 and 22. The first portion 14 has a tubular section 16 with an enlarged outside diameter and a through hole for screw 10 and a face plate 18 to which apparatus such as a printer carriage (not shown) may be bolted. Face plate 18 also has a through hole for screw 10. Screw 10 is normally driven by a step motor (also not shown). In some applications, the printer will print in both directions of travel of the nut assembly 12. In such applications, it is of utmost importance that minimum backlash occur in the gearing between the screw 10 and the carriage.

The first portion 14 of the nut forms approximately one-half of a cylindrical nut having internal threads 15 complementary to the external threads on screw 10. The second half 22 of the axially-split nut is provided with a raised shoulder 21 with an increased outside diameter but also having a through hole for screw 10. The second portion 22 also has internal threads 20 complementary to the external threads on screw 10. So far, the portions described are substantially identical to the elements shown in the patentees U.S. Pat. No. 4,131,031.

First portion 14 and second portion 22 are retained in an aligned position about screw 10 by retainer means 24. Retainer means 24 has an internal cylindrical shape which is coaxially disposed about threaded portions 20 and 15 of nut portions 22 and 14 to retain the opposing internal thread surfaces of nut portions 22 and 14 in alignment with the threads on screw 10.

An external thread 25 is provided as shown on the right hand portion of retaining means 24. Coaxially mounted on retaining means 24 is a torsion spring 26. The tangs 30 and 32 of which are engaged respectively in openings 23 and 29. The opening 29 is provided at one end (the right end side) of retainer means 24 and as more clearly shown in FIG. 4 opening 23 is located on the inside, or left side, surface of spacer means 28.

Figure 4:
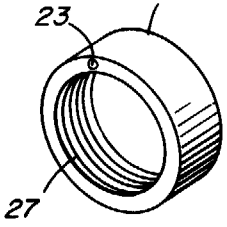
FIG. 4 is a perspective view of the spacing means of this invention.
Figure 5:
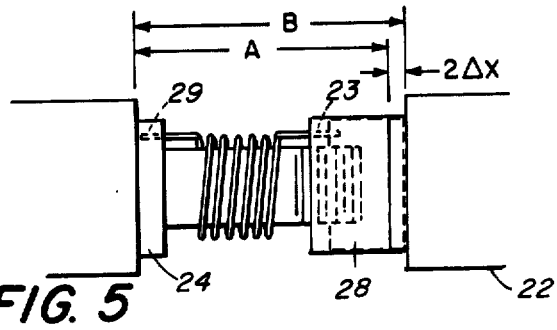
FIGS. 5 and 6 illustrate in schematic form the operation of the invention.
Figure 6:
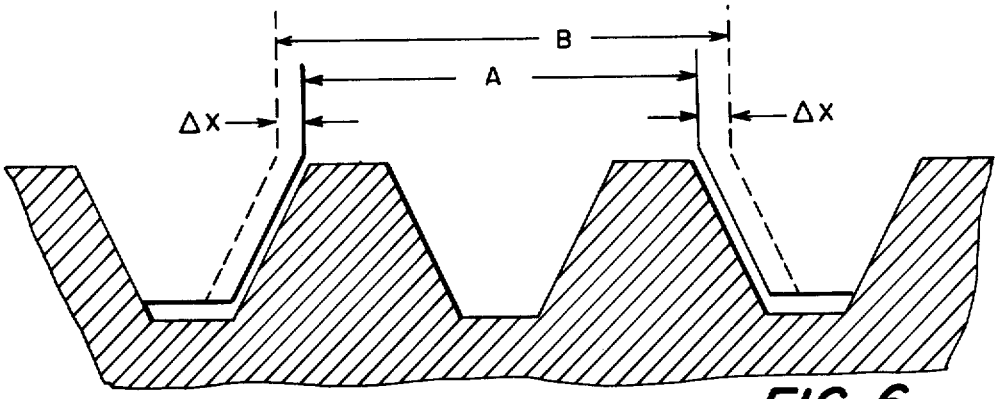

Spacer means 28 consists of a cylindrical spacer as shown in FIG. 4 having internal threads 27 which mate with the threads on retainer means 24. As can be seen from the schematic representation of FIGS. 5 and 6, the operation of the rotatably mounted spacer is as follows. The thread on the screw 10 or nut assembly will wear through use tending to create a space between opposing nut portions. Assume the wear is equal to $\Delta x$. There the space between nut halves would increase from A to B by a distance of $2\Delta x$. However, in accordance with this invention, as this occurs, the spacer means 28 which is torsionally biased by spring 26 is now free to rotate about the thread on retaining means 24 and thus take up the gap $2\Delta x$ left by nut wear.

The internal thread on spacer 28 is designed to have a sufficiently fine enough thread so as not to be contrarotated once advanced. The assembly thereby creates an extremely stiff anti-backlash of U.S. Pat. No. 4,131,031. At the same time, the torsion spring force required to rotate the spacer means 28 need only be enough to rotate the spacer longitudinally along the retainer 24 thereby imparting very little force between opposing nut halves. We thus have a very low torque system with extremely high system stiffness.

The various components of the axially-split anti-backlash nut assembly can be fabricated from a variety of materials. The first and second portions (respectively 14 and 22) of the nut could, for example, be fabricated from metal such as steel or cast bronze, or from any thermoplastic moldable polymer composition. It is preferable to mold components which contact the screw from low-friction self-lubricating polymer compositions which have outstanding wear characteristics. Other components could be similarly made from metal or plastics.

Figure 4A:
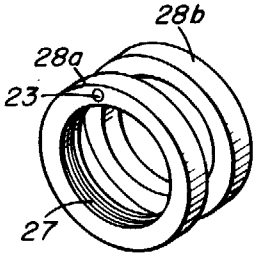
FIG. 4a is a perspective view of an alternate embodiment of the invention using a spacing means 28(a) and an additional elastomeric spacer 28(b).

It may also be desirable in some instances to provide a slightly elastomeric material such as a rubber washer 28b (as shown in FIG. 4A) itermediate the spacer 28a and the nut portion 22. The elastomeric spacer 28b would make the system slightly less stiff yet still allow for slight shaft irregularities frequently encountered in rolled formed lead screws 10, thus maintaining torque consistency over shaft length.

Figure 9:
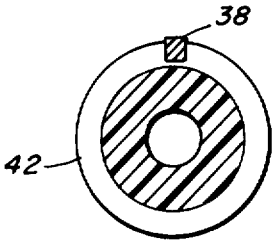
FIG. 9 is a sectional view of elements assembly of FIG. 7 taken along lines 8–9.
Figure 7:
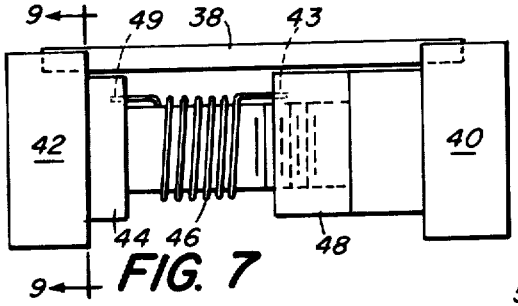
FIG. 7 is a cross-sectional view of another embodiment of the invention.

Another embodiment of the invention having a split nut arrangement whereby the nuts will move axially yet not rotate with respect to each other is shown in FIGS. 7 and 9 in which a bar 38 interfits with grooves in opposing nut portions 40 and 42 so as to permit axial (longitudinal) movement for a distance x of the nut portions but which prevents rotational or torsional movement of the opposing nut portions. A torsion spring 46 is located between nut portion 42 and spacer means 48. The respective tangs of spring 46 are inserted in openings 49 and 43 provided in retainer 44 and spacer means 48. Spacer 48 is rotatably mounted on external threads provided on nut portion 40. The spacer, as previously described, will take up any slack which may occur because of wear between the screw threads on screw 10 and internal threads(not shown) on nut portions 40 and 42.

Figure 8:
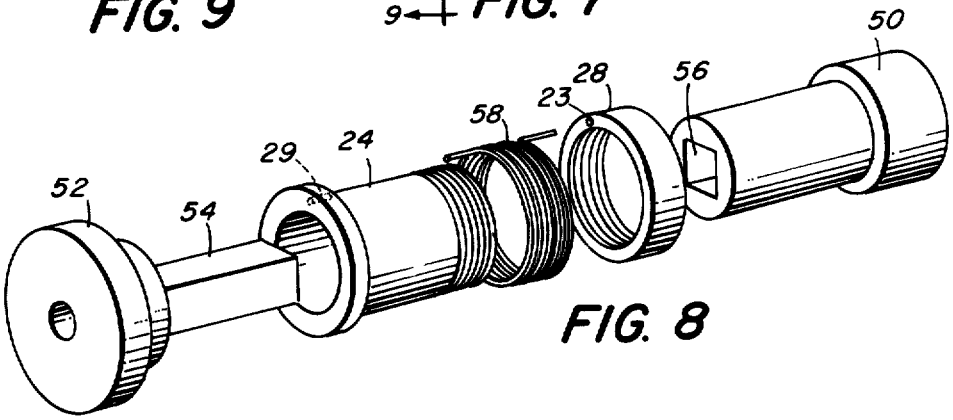
FIG. 8 is a perspective view of a further alternate embodiment of a split nut assembly of the invention.

FIG. 8 illustrates yet another embodiment of the invention wherein the opposing nut portions 52 and 50 consist of internally threaded interfitting members one of which has a squared external member 54 which fits inside the squared opening 56 in nut portion 50 whereby nut portion 52 is restrained from rotational movement with respect to nut portion 50 yet axial movement is provided between the two; which axial movement is taken up by the operation of torsion spring 58 and spacer means 28 as was described in connection with the previously described embodiments shown in FIGS. 1–7.

EQUIVALENTS

Those skilled in the art will recognize, or be able to ascertain, using no more than routine experimentation, many equivalents to specific components, elements, and steps described herein. For example, the retainer means 24 could be integrally molded or joined with left hand nut portion 14. Such equivalents are intended to be covered by the following appended claims.

I claim:

1. An assembly, comprising in combination:

a. a first nut portion having an internal thread;

b. a second nut portion having an internal thread;

c. retaining means for retaining said first nut portion and said second nut portion in a fixed non-radially rotatable aligned position with respect to each other on a threaded screw; and, d. spacer means between said first and second nut portions and rotatably mounted on said retaining means; and, e. biasing means causing the spacer means to react to any slack between opposing nut portions and axially rotate against at least one surface of one nut portion.

2. A nut assembly of claim 1 wherein the biasing means is a torsion spring having a tang on each end of the spring, one of which is inserted in said spacer means and the other tang is inserted in said retaining means.

3. An anti-backlash nut assembly of claim 1 wherein the nut portions comprise left and right axially-split nut portions.

4. An anti-backlash nut assembly of claim 1 wherein an elastomeric washer is provided intermediate the spacer means and the [retaining means] *said one surface of one nut portion.*

5. An anti-backlash nut and screw assembly in which the nut is designed to undergo translational movement along the screw, said screw having an external thread thereon, the movement of the nut being in response to relative rotational movement between the nut assembly and screw, comprising, in combination:

a. a first portion of said nut having an internal thread complementary to the external thread of said screw;

b. a second portion of said nut, also having an internal thread complementary to the external thread of said screw;

c. retaining means for retaining said first portion and said second portion of the nut in a non-radially rotatable aligned position around said screw to enable the internal threads of said nut portions to engage with the external threads of said screw;

d. spacer means adapted to move with respect to the first and second nut portions; and, e. biasing means for causing the spacer means to rotate on the retaining means about the screw axis and abut a surface of one of the nut portions and take up any slack between opposing nut portions which may occur from wear of the screw surfaces of the nut or screw.

6. An anti-backlash nut assembly of claim 5 wherein the spacer means has an internal thread which mates with external threads on said retaining means.

7. An anti-backlash nut assembly of claim 5 wherein said first and said second portions are restrained from torsional movement by a bar member interfitted into grooves on opposing portions of the nut.

8. An anti-backlash nut assembly of claim 5 in which the first portion of the nut has a non-circular outer surface which interfits with a corresponding non-circular inner surface of the second nut portion.

* * * * *